May 26, 1953    J. C. P. HARRIS ET AL    2,639,621
SHEAVE AND ADAPTER
Filed Dec. 22, 1950    2 Sheets-Sheet 1
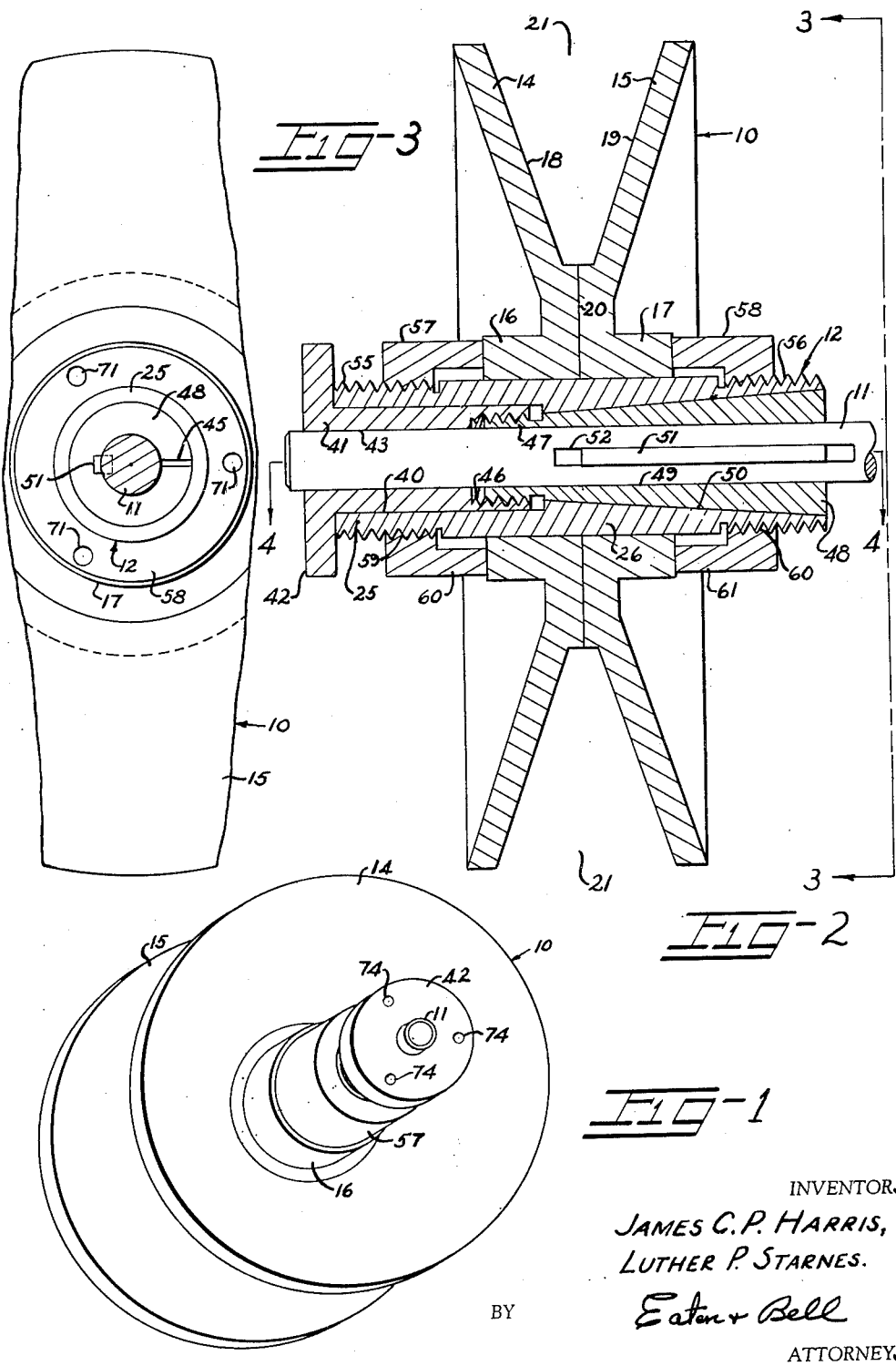
INVENTORS:
JAMES C. P. HARRIS,
LUTHER P. STARNES.
BY Eaton + Bell
ATTORNEYS May 26, 1953 — J. C. P. HARRIS ET AL — 2,639,621
SHEAVE AND ADAPTER
Filed Dec. 22, 1950 — 2 Sheets-Sheet 2

INVENTORS:
JAMES C. P. HARRIS,
LUTHER P. STARNES.
BY Eaton & Bell
ATTORNEYS

Patented May 26, 1953

2,639,621

UNITED STATES PATENT OFFICE 2,639,621

SHEAVE AND ADAPTER

James C. P. Harris and Luther P. Starnes,
Fort Mill, S. C.

Application December 22, 1950, Serial No. 202,321

7 Claims. (Cl. 74—230.17)

1

This invention relates to an improved sheave or pulley and adaptor and more especially to a sheave or pulley adapted to be fitted on a shaft and to have a V-belt passed therearound for transmitting rotation to the shaft.

This invention is particularly adapted to be used as a part of a drive for machinery in which the drive shaft is provided with a sheave made according to this invention and a V-belt is passed around the sheave and also is connected to a suitable source of power. It is well known that in using a sheave on a drive shaft to impart rotation to the shaft, the speed of rotation varies with the diameter of the sheave on the drive shaft and when it has been desired to change the speed of the drive shaft it has been necessary to remove the sheave from the drive shaft and replace the same with a sheave of a different diameter and this is obviously a time consuming and laborious operation as well as requiring that an operator keep on hand a number of sheaves of various sizes. Also in some machines such as in spinning machines and the like the speed of the drive shaft must be varied often and when the sheaves must be changed frequently, the machine is out of operation a good deal of the time and this increases the expense of operation.

It is therefore an object of this invention to provide a sheave adapted to be associated with the drive shaft of a machine or the like, but not limited thereto, and said sheave being formed of two annular members having tapered inner walls and a hub portion adapted to be fitted on an adaptor for mounting the same on a shaft, and also providing an adjustable adaptor wherein the position of the two annular members relative to each other may be varied thus varying the effective diameter of the composite member formed from the two annular members whereby the annular members may be placed on the adaptor and secured in position on a shaft to form a composite member with the tapered walls thereof forming a substantially V-shaped peripheral groove therearound and by adjusting the adaptor the two annular members may be moved toward each other or apart from each other to thus vary the effective diameter of the member which is encircled by a V-belt.

It is another object of this invention to provide a sheave having two complementary members forming a composite member having a peripheral groove therein and also providing an adaptor for securing said complementary members on a shaft and spanner nuts associated with said adaptor for holding said complementary

2 members together and means for adjusting said spanner nuts to adjust the distance between said complementary members to thus vary the effective diameter of the composite sheave.

It is another object of this invention to provide a sheave of the type described having two annular members whose proximate walls tapered inwardly toward each other to form a V-shaped groove about the periphery of the sheave and having means for moving the annular members toward or away from each other as desired and said sheave being so constructed as to cause the pressure of a V-belt positioned thereabout to urge the annular members apart from each other.

It is another object of this invention to provide an improved sheave and adaptor therefor which may readily be positioned on or removed from one end of a drive shaft and the adaptor being so constructed as to hold the improved sheave securely in the desired position on the drive shaft and having spanner nuts associated therewith to permit adjustment of the effective diameter of the sheave whereby the diameter may be varied as desired to vary the speed of rotation imparted to the drive shaft from the sheave.

Some of the objects of the invention having been stated, other objects will appear as the description proceeds, when taken in connection with the accompanying drawings, in which—

Figure 1 is an isometric view of the improved sheave and adaptor associated with a shaft;

Figure 2 is a vertical sectional view through the sheave, adaptor and shaft;

Figure 3 is a fragmentary end view of the sheave with parts in section and looking substantially along the line 3—3 in Figure 2;

Figures 4, 5, 6, 7:
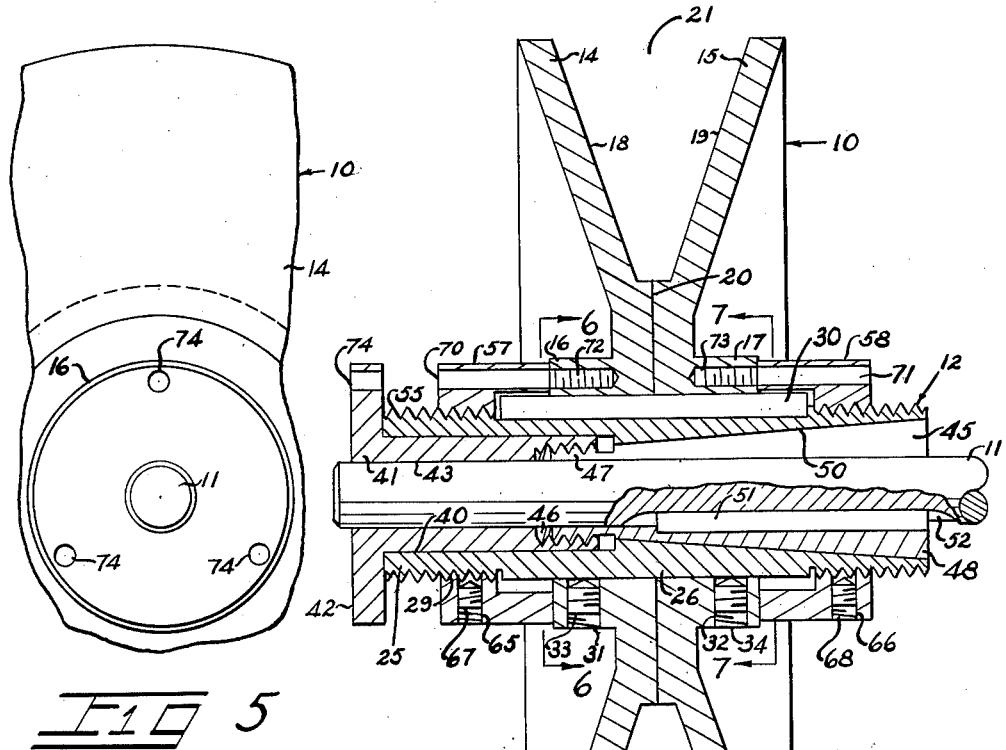
Figure 4 is a cross-sectional view of the improved sheave, adaptor and shaft taken substantially along the line 4—4 in Figure 2.
Figure 5 is a fragmentary end view of the sheave and adaptor with parts in section looking at the left-hand side of Figure 4.
Figure 6 is a cross-sectional view through the adaptor taken along the line 6—6 in Figure 4.
Figure 7 is a cross-sectional view through the sheave and adaptor, taken along the line 7—7 in Figure 4.

Referring more specifically to the drawings the improved sheave or pulley is broadly indicated at 10 and is adapted to be mounted on a shaft 11 by means of an adaptor broadly designated at 12. The shaft 11 may be a drive shaft of any suitable machinery such as a spinning machine or the like and the sheave 10 is so mounted on the shaft 11 that a V-belt, not shown, may be passed about the sheave 10 and may also be passed about a suitable sheave or the like connected to a source of power for transmitting rotation to the shaft 11.

The sheave 10 comprises two annular plates 14 and 15 which are complementary and have tapered walls so that each plate is substantially dish-shaped and the annular plates 14 and 15 are provided with hub portions 16 and 17, respectively. It will thus be observed in Figures 1 and 4 that the complementary plates 14 and 15 have their inner or proximate walls tapered as at 18 and 19, respectively, and the juncture portions of the proximate walls adjacent the hubs 16 and 17 are flat as at 20 so that when the flat portions 20 of the plates 14 and 15 are placed together a groove 21 is formed between the two members so that the composite sheave 10 has the groove 21 about the periphery thereof, the groove 21 being substantially V-shaped.

A sleeve 25 having an inner diameter greater than the outer diameter of the shaft 11 is positioned about the shaft 11 and penetrates the hub portions 16 and 17 of the plates 14 and 15 of the sheave 10. This sleeve 25 is part of the sheave adaptor 12 and is provided with a central portion 26 which preferably has a substantially smooth periphery and which portion is secured against rotation in the hub portions 16 and 17 as by means of a key 30 which penetrates suitable corresponding keyways in the hubs 16 and 17 and in the portion 26 of the sleeve 25. The plates 14 and 15 are thus held against the rotation relative to the sleeve 25 but may have longitudinal sliding movement thereon. The hub portions 16 and 17 of the plates 14 and 15 are also provided with threaded bores 31 and 32, respectively, adapted to have set screws 33 and 34 fitted therein for further securing the plates 14 and 15 on the portion 26 of the sleeve 25 to prevent backlash of the sheave 10 during operation and to hold said plate members 14 and 15 in the desired relation to each other and to prevent longitudinal sliding movement of the same on the sleeve 25. By use of the set-screws 33 the sheave may be adjusted longitudinally of the shaft 11.

The sleeve 25 has a cylindrical bore 40 therein adapted to receive the body portion of a bushing 41 having a flange portion 42 thereon. The bushing 41 has a bore 43 therein which is of slightly greater diameter than the shaft 11 and which is penetrated by the shaft 11 when the bushing is positioned about the shaft 11 whereby the bushing 41 may have free rotation about the shaft 11. The bushing extends inwardly from the flange 42 and the bore 43 thereof is enlarged and threaded as at 46 for reception of the threaded end portion 47 of a substantially conically-shaped or tapered split-bearing 48 which is also provided with an internal bore 49 adapted to be penetrated by the shaft 11 when the tapered bushing 48 is positioned about the shaft 11. The bushing 48 is split as at 45.

The end of the sleeve 25 opposed from the bushing 41 is provided with a tapered bore 50 which communicates with the bore 40 and has a taper corresponding to the taper of the bushing 48 and is adapted to have the tapered bushing 48 positioned therein and about the shaft 11. The tapered bushing 48 is secured on the shaft 11 against rotation therewith by means of a key 51 positioned in coinciding keyways 52 in the shaft 11 and the tapered bushings 48.

The opposed ends of the sleeve 25 are reduced and threaded as at 55 and 56, respectively, for reception of spanner nuts 57 and 58, respectively, having internally threaded bores 59 and 60, respectively, and inwardly extending peripheral flange portions 60 and 61 respectively. The flange portions 60 and 61 of the spanner nuts 57 and 58 respectively are adapted to fit against the outer opposed surfaces of the hubs 16 and 17 of the annular plates 14 and 15.

The spanner nuts 57 and 58 are each provided with transversely extending threaded bores 65 and 66, respectively, adapted to receive set screws 67 and 68, respectively, for securing the spanner nuts 57 and 58 in position on the sleeve 25, to thus hold the annular plates 14 and 15 of the sheave 10 in the desired position relative to each other. The spanner nuts 57 and 58 are each provided with one or more bores 70 and 71, respectively, which coincide with threaded bores 72 and 73 in the respective hubs 16 and 17 of the annular plates 14 and 15. The number of bores 70 to 73, inclusive, which are provided may vary as desired and for purposes of illustration each of the hub portions 16 and 17 are shown as being provided with three spaced threaded bores 72 and 73 and each of the spanner nuts 57 and 58 are shown as being provided with three circumferentially spaced bores 70 and 71, respectively.

The bores 70 to 73, inclusive, are provided as a means for moving the annular plate 14 and 15 apart from each other should the same become adhered to each other in an undesired position. It is thus seen that when it is desired to move the plate 15 away from the plate 14 a suitable bolt, not shown, may be inserted in one or more of the bores 73 in the hub portion 17 of the plate 15 and the bolt also penetrating one of the bores 71 in the spanner nut 58 and by rotation of the bolt in the threaded bore 73 the plate 15 will be caused to be moved toward the spanner nut 58, it being understood that the spanner nut 58 should first be loosened on the sleeve 25 so that the flange portion 61 thereof is in spaced relation to the hub 17 of the plate 15.

When it is desired to move the plate 14 away from the plate 15, this may be done in a like manner except that it should be noted that the flange portion 42 of the bushing 41 is provided with one or more bores 74 whereby the spanner nut 57 may be loosened on the sleeve 25 so that the flange portion 60 thereof is in spaced relation to the hub portion 16 of the plate 14 and a suitable bolt, not shown, may be inserted through the bores 74 and 70 and have the end thereof threadably inserted in one of the threaded bores 72 in the hub portion 16 of the plate 14 and by imparting rotation to the bolt, the plate 14 will be pulled away from the plate 15. It should be noted that before moving the plates 14 and 15 away from each other and longitudinally on the shaft 11 the set screws 31 and 32 should be loosened.

In operation the sheave and adaptor may be placed on a suitable shaft by securing the portions of the adaptor together in relatively loose fashion and sliding the bushings 45 and 41 onto the shaft 11 at which time the bushing 41 may be rotated to cause the tapered split bushing 48 to move tightly into the bore 50 in the sleeve 25 to exert a binding force thereon to hold the sleeve 25 in secured position about the shaft 11, and prevent relative rotation therewith. The spanner nuts 57 and 58 may then be adjusted to hold the plate members 14 and 15 in the desired position relative to each other and the set screws 31, 32, 67 and 68 may be tightened to hold the parts in the desired position.

It will be observed that when the plates 14 and 15 are fixed in engagement with each other as shown in Figures 2 and 4, the width of the peripheral groove 21 in the sheave 10 will be relatively narrow so that a V-belt, not shown, positioned thereabout will extend around a relatively large diameter. Now, when it is desired to change the speed of rotation of the shaft 11 rather than having to take off the sheave entirely and place a new sheave of a smaller diameter thereon it is merely necessary to loosen the set screws 31, 32 and 67 and 68 and to move the spanner nuts 57 and 58 away from each other so that the plate members 14 and 15 may be moved into spaced relation to each other, utilizing a bolt in the threaded bores 72 and 73 if necessary. It will readily be observed that this will cause the peripheral groove 21 to become substantially wider so that a V-belt positioned thereabout will be positioned nearer the center of the shaft 11 than heretofore and thus will extend around a smaller diameter than before to thus vary the speed of rotation of the shaft 11.

When the plates 14 and 15 are thus moved into the desired spaced relation the spanner nuts 57 and 58 may be moved so that the flanges 60 and 61 thereon will engage the hub portions 16 and 17 respectively to prevent the plates 14 and 15 from moving a greater distance apart. The set screws 67 and 68 may then be tightened to hold the spanner nuts in the desired position. The set screws 33 and 34 may be tightened in the hub portions 16 and 17 respectively, to hold the plates 14 and 15 against movement toward each other. It should also be observed that should the set screws 33 and 34 be omitted or not be tightened the pressure of a V-belt disposed within the groove 21 will urge the plates 14 and 15 apart from each other to give the desired effective diameter to the sheave 10.

In the drawings and specification there has been set forth a preferred embodiment of the invention and although specific terms are employed, they are used in a generic and descriptive sense only and not for purposes of limitation, the scope of the invention being defined in the claims.

We claim:

1. A sheave and adaptor adapted to be mounted on a shaft comprising a tapered bearing positioned on said shaft, means for holding said tapered bearing against relative rotation on said shaft, a bushing having a body portion positioned on said shaft, one end of said bushing having an enlarged threaded bore therein, one end of said tapered bearing being threaded for engagement in the threaded bore in said bushing, a sleeve positioned about said bushing and said tapered bearing, said sleeve having a straight bore in one end thereof adapted to receive the body portion of said bushing, said sleeve having a tapered bore in the other end thereof adapted to receive the tapered bearing, said sleeve having a hub portion, a pair of annular disks adjustably mounted on said hub portion, said annular disks being concavo-convex and forming a V-shaped groove therebetween and means for positioning said disks relative to each other to vary the width of the groove formed therebetween.

2. A sheave and adaptor adapted to be mounted on a shaft comprising a split tapered bearing positioned on said shaft, means for holding said split tapered bearing against relative rotation of said shaft, a bushing having a body portion positioned on said shaft, one end of said bushing having an enlarged threaded bore therein, one end of said tapered bearing being threaded for engagement in the threaded bore in said bushing, a sleeve positioned about said bushing and said tapered bearing, said sleeve having a straight bore in one end thereof adapted to receive said bushing and a tapered bore in the other end thereof adapted to receive the split tapered bearing, said sleeve having a hub portion, a pair of concavo-convex disks adjustably mounted on the hub portion of said sleeve, said concavo-convex disks being oppositely directed to form a V-shaped peripheral groove therebetween adapted to receive a V-belt, means for positioning said concavo-convex disk relative to each other to vary the width of the peripheral groove formed therebetween and spanner nuts threadably mounted on said sleeve for holding said concavo-convex disks in the desired position on said sleeve.

3. A sheave adapted to be mounted on a shaft comprising a split tapered bearing having a bore therein and being positioned about said shaft, a bushing having a bore therein and being positioned about the shaft, said bushing having an enlarged threaded bore in one end thereof, said split tapered bearing having one end thereof threaded for engagement in said threaded bore in said bushing, a sleeve positioned about said bushing and said split tapered bearing, said sleeve having a straight bore in one end thereof disposed about said bushing and a tapered bore at the other end thereof disposed about said split tapered bearing whereby said bushing and said tapered bearing may be tightened together to hold said sleeve in position on said shaft, a pair of annular disks adjustably mounted on said sleeve, each end of said sleeve being externally threaded and having a spanner nut positioned thereon, said spanner nuts being adapted to engage the opposed sides of said annular disks, whereby said spanner nuts may be moved to adjust the position of said disks on said sleeve and relative to each other.

4. A sheave adapted to be mounted on a shaft comprising a split tapered bearing having a bore therein and being positioned about said shaft, a bushing having an enlarged threaded bore in one end thereof, said split tapered bearing having one end thereof threaded for engagement in said threaded bore in said bushing, a sleeve positioned about said bushing and said split tapered bearing, said sleeve having a straight bore in one end thereof disposed about said bushing and a tapered bore at the other end thereof disposed about said split tapered bearing whereby said bushing and said tapered bearing may be tightened together to hold said sleeve in position on said shaft, said split tapered bearing being keyed to said shaft to prevent relative relation therebetween, a pair of annular disks adjustably mounted on said sleeve, each of said annular disks having opositely directed tapered walls forming a V-shaped peripheral groove between said annular disks adapted to have a V-belt positioned therein for driving said shaft, each end of said sleeve being externally threaded and having a spanner nut positioned thereon, said spanner nuts being adapted to engage the opposed sides of said annular disks, whereby said spanner nuts may be moved to adjust the position of said disks on said sleeve relative to each other to vary the width of the V-shaped peripheral groove therebetween and the effective diameter of the sheave.

5. A sheave adapted to be mounted on a shaft comprising a split tapered bearing having a bore therein and being positioned about said shaft, a bushing having a bore therein and being positioned about said shaft, said bushing having an enlarged threaded bore in one end thereof, said split tapered bearing having one end thereof threaded for engagement in said threaded bore in said bushing, a sleeve positioned about said bushing and said split tapered bearing, said sleeve having a straight bore in one end thereof disposed about said bushing and a tapered bore at the other end thereof disposed about said split tapered bearing whereby said bushing and said tapered bearing may be tightened together to hold said sleeve in position on said shaft, said split tapered bearing being keyed to said shaft to prevent relative rotation therebetween, a pair of annular disks adjustably mounted on said sleeve, each of said annular disks having oppositely directed tapered walls forming a V-shaped peripheral groove between said annular disks adapted to have a V-belt positioned therein for driving said shaft, each end of said sleeve being externally threaded and having a spanner nut positioned thereon, said spanner nuts being adapted to engage the opposed sides of said annular disks, whereby said spanner nuts may be moved to permit adjustment of the position of said disks on said sleeve relative to each other to vary the width of the V-shaped peripheral groove therebetween and the effective diameter of the sheave, said annular disks being keyed to said sheave for longitudinal sliding movement thereon and said annular disks also having set screws therein for assisting in holding said annular disks in position on said sleeve.

6. A sheave adapted to be mounted on a shaft comprising a split tapered bearing positioned about said shaft, a bushing positioned about said shaft, said bushing having an enlarged theaded bore in one end thereof, said split tapered bearing having one end thereof threaded for engagement in said threaded bore in said bushing, a sleeve positioned about said bushing and said split tapered bearing, said sleeve having a straight bore in one end thereof disposed about said bushing and a tapered bore at the other end thereof disposed about said split tapered bearing whereby said bushing and said tapered bearing may be tightened together to hold said sleeve in position on said shaft, a pair of annular disks adjustably mounted on said sleeve, each of said annular disks having oppositely directed tapered walls forming a V-shaped peripheral groove between said annular disks adapted to have a V-belt positioned therein for driving said shaft, each of said annular disks also being provided with centrally disposed complementary hub portions, each end of said sleeve being externally threaded and having a spanner nut positioned thereon, said spanner nuts being adapted to engage the hub portions of said disks, whereby said spanner nuts may be moved to adjust the position of said disks relative to each other to vary the width of the V-shaped peripheral groove therebetween and the effective diameter of the sheave.

7. A sheave adapted to be mounted on a shaft comprising a split tapered bearing positioned about said shaft, a bushing positioned about said shaft, said bushing having an enlarged threaded bore in one end thereof, said split tapered bearing having one end thereof threaded for engagement in said threaded bore in said bushing, a sleeve positioned about said bushing and said split tapered bearing, said sleeve having a straight bore in one end thereof disposed about said bushing and a tapered bore at the other end thereof disposed about said split tapered bearing whereby said bushing and said tapered bearing may be tightened together to hold said sleeve in position on said shaft, a pair of annular disks adjustably mounted on said sleeve, each of said annular disks having oppositely directed tapered walls forming a V-shaped peripheral groove between said annular disks adapted to have a V-belt positioned therein for driving said shaft, each of said annular disks also being provided with centrally disposed complementary hub portions, each end of said sleeve being externally threaded and having a spanner nut positioned thereon, said spanner nuts being adapted to engage the hub portions of said disks, whereby said spanner nuts may be moved to adjust the position of said disks relative to each other to vary the width of the V-shaped peripheral groove therebetween and the effective diameter of the sheave, the opposed sides of said hub portions being provided with at least one threaded bore therein and said spanner nuts having at least one bore therein whereby the spanner nuts may be spaced from the hub portions and bolts inserted therethrough may be tightened in the threaded bores in the hub portions to pull the same apart.

JAMES C. P. HARRIS.
LUTHER P. STARNES.

References Cited in the file of this patent

UNITED STATES PATENTS

| Number | Name | Date |
|---|---|---|
| 413,943 | Hughes | Oct. 29, 1889 |
| 480,107 | Lewis | Aug. 2, 1892 |
| 1,371,212 | Adams | Mar. 15, 1921 |
| 2,013,268 | Douville | Sept. 9, 1935 |
| 2,245,695 | Mantle | June 17, 1941 |
| 2,401,178 | Oehler | May 28, 1946 |

FOREIGN PATENTS

| Number | Country | Date |
|---|---|---|
| 384,690 | France | Dec. 5, 1907 |